United States Patent
Lee et al.

(10) Patent No.: US 9,408,149 B2
(45) Date of Patent: Aug. 2, 2016

(54) METHOD OF MANAGING COMMUNICATION TRAFFIC FOR MULTIPLE COMMUNICATION TECHNOLOGIES AND COMMUNICATION DEVICE THEREOF

(71) Applicant: RALINK TECHNOLOGY CORPORATION, Jhubei, Hsinchu County (TW)

(72) Inventors: Yu-Ju Lee, Tongxiao Township, Miaoli County (TW); I-Feng Su, Hsinchu (TW); Hao-Sheng Hsu, Hengshan Township, Hsinchu County (TW); Pao-Chen Wu, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 592 days.

(21) Appl. No.: 13/846,202

(22) Filed: Mar. 18, 2013

(65) Prior Publication Data

US 2014/0269309 A1    Sep. 18, 2014

(51) Int. Cl.
| | |
|---|---|
| H04W 28/02 | (2009.01) |
| H04W 52/02 | (2009.01) |
| H04L 12/26 | (2006.01) |
| H04W 72/12 | (2009.01) |
| H04W 84/18 | (2009.01) |

(52) U.S. Cl.
CPC .......... *H04W 52/0235* (2013.01); *H04W 72/12* (2013.01); *H04W 84/18* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 8,244,944 B1* | 8/2012 | Wong | ..................... | H04W 48/02 370/329 |
| 8,412,097 B2* | 4/2013 | Tao | ................... | H04W 72/1215 370/338 |
| 8,554,137 B2* | 10/2013 | Wyper | .................. | H04W 88/06 455/41.2 |
| 2011/0299510 A1* | 12/2011 | Kim | ....................... | H04B 1/406 370/338 |
| 2012/0060158 A1* | 3/2012 | Kadous | ............. | H04W 72/1215 718/100 |
| 2014/0064398 A1* | 3/2014 | Ibrahim | ................. | H01Q 21/29 375/267 |
| 2015/0222316 A1* | 8/2015 | Ibrahim | ................. | H01Q 21/29 455/78 |

* cited by examiner

*Primary Examiner* — Eunsook Choi
(74) *Attorney, Agent, or Firm* — McClure, Qualey & Rodack, LLP

(57) ABSTRACT

A method and a communication device for managing communication traffic for multiple communication technologies are provide. The method, performed by a communication device to manage communications with a first and a second network having a first and a second communication technology, respectively, includes: determining, by a second communication module, whether a first transmission of the first communication technology is in progress before proceeding with a second transmission having the second communication technology; when the first transmission is in progress, initiating, by a second communication module, an unavailable period of the first communication technology; initiating, by a second communication module, notification of the unavailability of the first communication technology to the first network; and proceeding, by the second communication module, with the second transmission.

22 Claims, 13 Drawing Sheets

METHOD OF MANAGING COMMUNICATION TRAFFIC FOR MULTIPLE COMMUNICATION TECHNOLOGIES AND COMMUNICATION DEVICE THEREOF

BACKGROUND OF THE INVENTION

1. Field of the Invention

The present invention relates to communication network, and in particular relates to a control method and a communication device for managing transmission traffic for multiple communication technologies.

2. Description of the Related Art

Over the years, wireless communication devices have evolved from simple devices such as cellular phones and pagers to multi-mode devices that support multiple communication connectivity for various communication technologies such as WiFi, WiMAX, and Bluetooth.

Simultaneous use of a plurality of radios associated with the plurality of communication technologies by a multi-radio device causes performance problems, for example, interference caused in the multi-radio device when each of the plurality of radios operate in adjacent/overlapping frequency bands/channels. As a result of this interference, a transceiver of the co-located transceivers in the multi-radio device may fail to distinguish between, a desired signal meant for processing or an undesired signal meant for processing by a co-located transceiver. Consequently, such interference causes degradation of service quality, for example, poor voice quality, errors in the sent or received data, and complete loss of a communication link.

BRIEF SUMMARY OF THE INVENTION

An embodiment of a method performed by a communication device to manage communications with a first and a second network having a first and a second communication technology, respectively, is described. The method comprises: determining, by a second communication module, whether a first transmission of the first communication technology is in progress before sending a second transmission having the second communication technology; when the first transmission is in progress, initiating, by a second communication module, an unavailable period of the first communication technology; initiating, by a second communication module, notification of the unavailability of the first communication technology to the first network; and sending, by the second communication module, with the second transmission.

Another embodiment of a communication device is also provided. The communication device manages communications with a first and a second network and comprises: a processor and a memory device, wherein the processor is configured to install first and second device drivers to the memory device and execute the first device driver to perform communication with the first network having a first communication technology, and execute the second device driver to perform communication with the second network having a second communication technology. The processor determines whether a first transmission of the first communication technology is in progress before sending a second transmission having the second communication technology, and when the first transmission is in progress, an unavailable period of the first communication technology is initiated, and notification of the unavailability of the first communication technology to the first network is initiated, before the second transmission is sent.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
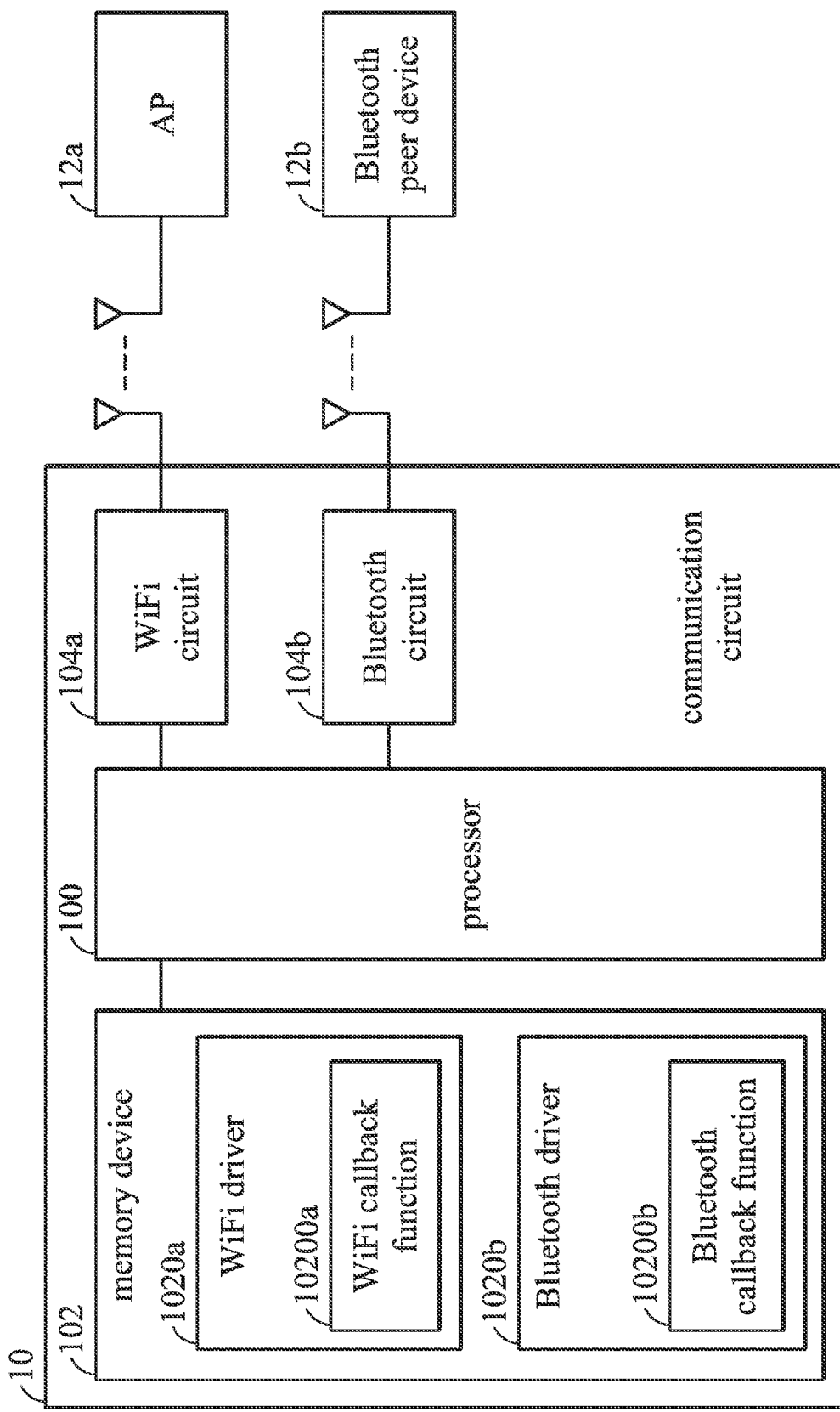
FIG. 1 is a block diagram of a communication device 10 operative with two or more communication networks according to an embodiment of the invention.

FIG. 1 is a block diagram of a communication device 10 operative with two or more communication networks according to an embodiment of the invention, including a processor 100, a memory device 102, a first communication circuit 104a, and a second communication circuit 104b. The communication device 10 may be a Personal Digital Assistant (PDA), a mobile phone, a laptop computer, a tablet computer, a Customer Premises Equipment (CPE), a personal computer, or any device providing accesses to two or more communication technologies. The communication device 10 can support two or more communication technologies occupying substantially the same or partially the same (overlapped) frequency band(s), for example, Bluetooth, a Wireless Local Area Network (WLAN), a Worldwide Interoperability Microwave Access (WiMAX), a Wireless Metropolitan Area Network (WMAN), Long Term Evolution (LTE) and other telecommunication technologies occupying substantially the same or overlapped Radio Frequency (RF) spectrum. The Bluetooth technology operates in a frequency spectrum of 2.4 GHz. The WLAN technology operates in the frequency spectrum of 2.4 GHz-2.5 GHz. The WiMAX technology operates in the frequency spectrum of 2.3 GHz-2.4 GHz and 2.5 GHz-2.7 GHz. The LTE may adopt 2.3-2.6 GHz frequency spectrum for operation. Accordingly, the telecommunication technologies used by the communication device 10 may share the same range of the frequency spectrum. In order to reduce signal interference and data collision between different telecommunication technologies, the communication device 10 can manage the uplink and downlink traffic of various telecommunication technologies by multiplexing various radio traffics in time.

Specifically, the communication device 10 can appoint one of the telecommunication technologies as a traffic scheduler for controlling the radio traffic via air according to predefined weightings. The traffic scheduler may be determined according to a traffic resolution or service type. The traffic resolution may be defined by a minimal time unit, or a timeslot, of a transmission data for the communication technology. For example, in Bluetooth protocol, each transmission or reception traffic takes place in real-timeslots that are 625 microseconds in duration. In WLAN or WiMAX protocol, the uplink and downlink frame duration is in the millisecond range such as 3 ms for a downlink sub-frame and 2 ms for an uplink sub-frame. Therefore, the communication device 10 may adopt the Bluetooth communication technology as the traffic scheduler. The service type of the communication service may be a real-time traffic or a non-real-time traffic. The real-time traffic requires accurate timing synchronization between the traffic source and destination, while the non-real-time traffic has no reliance on time synchronization between the traffic source and destination. When the communication device 10 concurrently requests for the real-time service such as Voice Over IP (VoIP) and the non-real-time service such as a File Transfer Protocol (FTP) or browser applications, the communication technology with the real-time service may be employed as the traffic scheduler. In some implementations, the traffic scheduler may stop a communication session from the other communication technology and initiate a communication session for the traffic scheduler at the software, firmware, or hardware level. In other implementations, the traffic scheduler may assigned a weighting to each communication technology and activate a communication technology according to the assigned weighting. The weightings for all available communication technologies may be assigned by a software program configurable by a user or a program developer.

The communication device 10 includes a processor 100, a memory device 102, and two or more communication circuits 104a and 104b. The processor 100 is coupled to the memory device 102 and the two or more communication circuits 104a and 104b. The processor 100 can allocate memory spaces in the memory device 102 and install device drivers such as a WiFi driver 1020a or a Bluetooth driver 1020b to the allocated memory spaces, allowing high-level computer programs to control and interact with the communication circuits 104a and 104b, respectively. The WiFi driver 1020a and the Bluetooth driver 1020b can contain a WiFi function 10200a and a Bluetooth function 10200b, respectively, and each can perform WiFi and Bluetooth functions such as generating a data frame, establishing a communication link with an external network, transmitting or receiving a data transmission, and other communication data processing functions. Once installed, the WiFi driver 1020a, the Bluetooth driver 1020b and the functions thereof can be retrieved from the allocated memory spaces. The memory device 102 may be a Static Random Access Memory (SRAM) or Dynamic RAM (DRAM).

The two or more communication circuits 104a and 104b, utilizing different communication technologies, may or may not have hardware connections therebetween. For explanatory purposes, hereinafter, the first communication circuit 104a is directed to the WLAN communication technology and the second communication circuit 104b is directed to the Bluetooth communication technology. In some embodiments, the two or more communication circuits 104 have no direct connection therebetween, and the traffic scheduler can reside in the device driver 1020b or firmware for the Bluetooth communication technology, and manage the time division mechanism for the Bluetooth and WiFi transmissions. Each communication circuit 104 may comprise analog circuits and digital circuits to perform analog-to-digital conversion (ADC), digital-to-analog conversion (DAC), gain adjustment, modulation, demodulation, signal filtering processes and digital signal processing. Further, the Bluetooth communication technology can employ firmware or hardware for the link control (LC) protocol which carries out the baseband protocols and other low-level link routines. The WiFi communication technology can include firmware or hardware for a media access control (MAC) layer which provides addressing and channel access control mechanisms for several WLAN stations to communicate within a multiple access network in a shared medium. The processor 100 can execute the instruction codes in the first device driver 1020a for controlling the communication circuit 104a to communicate with a WLAN access point 12a, and likewise, execute the instruction codes in the second device driver 1020b for controlling the communication circuit 104b to communicate with another Bluetooth peer device 12b. In the case of for a WiMAX or LTE network, the processor 100 can execute the instruction codes in the corresponding device driver 1020 for controlling the corresponding communication circuit 104 to communicate with a WiMAX base station or an Evolved Node B (eNB) 12.

The communication device 10 can manage the Bluetooth and WiFi traffic, allowing two communication technologies to share the same transmission resources, including the transmission medium and spectrum without signal interference and data collision.

People with ordinary skills in the art may recognize that two or more communication circuits may be incorporated in the communication device 10. Further, one or more antennas 106 may be shared between the communication technologies.

Figure 2:
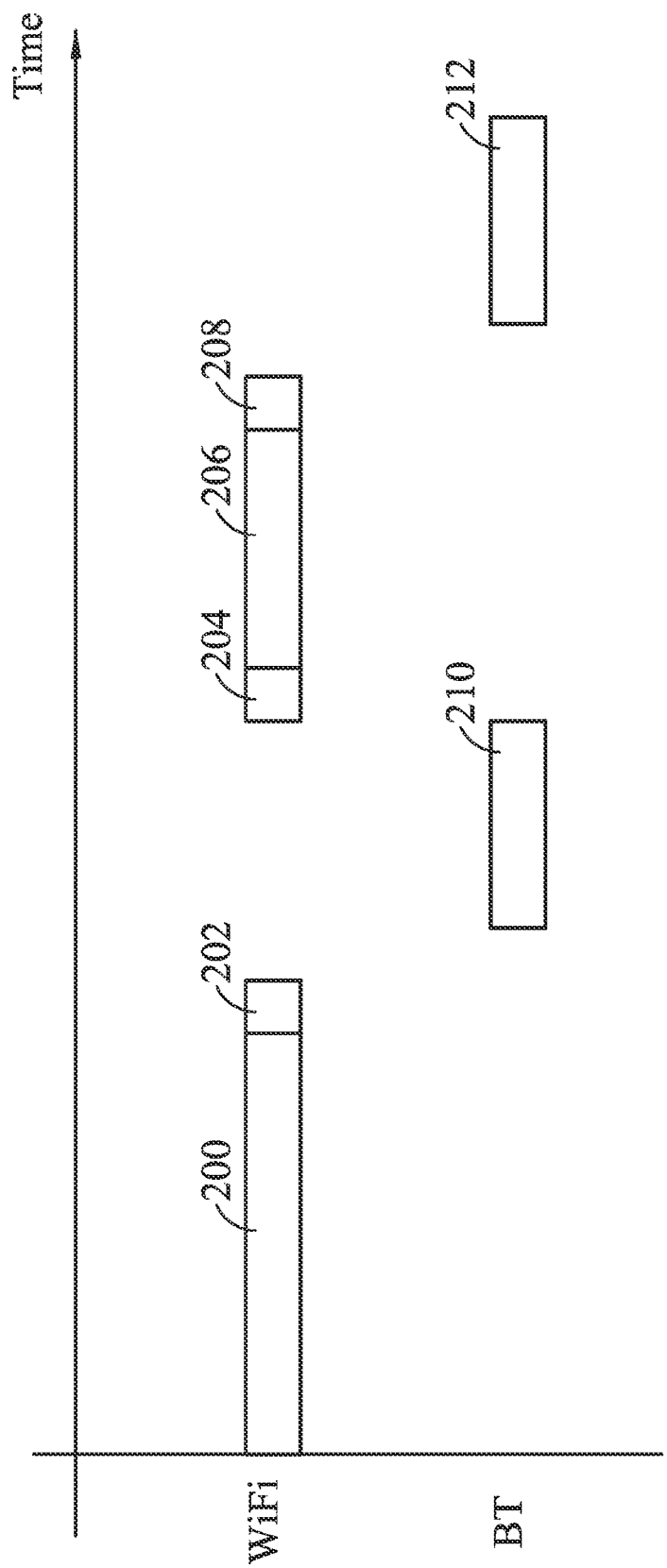
FIG. 2 is a timing diagram for time division management of the WiFi and Bluetooth traffic according to an embodiment of the invention.

FIG. 2 illustrates an exemplary timing diagram for time division management of the WiFi and Bluetooth traffic incorporated by the communication device 10 in FIG. 1 according to an embodiment of the invention, with the horizontal axis showing the time, and the vertical axis showing the WiFi and Bluetooth traffic. The Bluetooth device driver, firmware, or circuit can serve as the traffic scheduler for multiplexing the WiFi and Bluetooth traffic, so that the two communication technologies can share the same frequency spectrum for data transmission. The Bluetooth traffic scheduler can regard the WiFi traffic as a virtual Bluetooth link, and share a part of the time to the WiFi traffic according to the predetermined weighting, thereby controlling the ratio of the WiFi and Bluetooth transmissions on the overlapped frequency spectrum.

The WiFi network adopts an adaptive data rate scheme, determining a data packet rate of the WiFi transmission according to the channel condition. Failure to receive an acknowledgement from the communication device 10 may cause the WiFi network to determine that the channel condition has degraded, resulting in a reduced data packet rate for subsequent WiFi transmissions. Therefore, when a Bluetooth transmission is scheduled to be launched and a WiFi transmission is in progress, the Bluetooth traffic scheduler can generate an interrupt event to inform the WiFi driver 1020a of the imminent Bluetooth traffic. In response to the interrupt event, the WiFi driver 1020a can submit a NULL frame with a power saving bit equal to 1 to the WiFi network, suspending further WiFi data traffic between the communication device 10 and the AP 12a and preventing the AP 12a from experiencing a reduction in the data packet rate. The interrupt event is required to be delivered to the WiFi driver 1020a promptly so that when the Bluetooth transmission is ready to be transmitted via air, the WiFi transmission has already been completed. The power mode of the WiFi communication technology of the communication device 10 is indicated by a power management bit in a MAC header of an uplink sub-frame sent by the communication device 10. The power management bit being set to 1, indicates that the communication device 10 is in a power saving mode, and the power management bit being set to 0 represents that the communication device 10 is available for transmission of buffered WLAN data.

In the example in FIG. 2, the WiFi data traffic includes sub-frames 200, 202, 204, 206, and 208, and the Bluetooth data traffic includes slots 210 and 212. In some embodiments, the Bluetooth driver 1020b may act as the traffic scheduler, scheduling an imminent Bluetooth slot 210 in a transmission queue when the sub-frame 200 is being transmitted via air. The Bluetooth driver 1020b may generate an interrupt event to the WiFi driver 1020a, allowing the WiFi driver 1020a to complete the ongoing WiFi transmission and then inform the WiFi network of the unavailability of the WiFi communication via the sub-frame 202 with a power saving bit set to 1 in the MAC header of a NULL frame. The WiFi driver 1020a can request the Bluetooth driver 1020b to conduct a transmission session. In response, the Bluetooth driver 1020b can schedule the WiFi transmission into the transmission queue. The Bluetooth driver 1020b can conduct the scheduled Bluetooth transmission with the peer Bluetooth device 12b with the slot 210, and initiate a subsequent scheduled WiFi transmission upon completion of the Bluetooth transmission by prompting the WiFi driver 1020a to send another NULL frame 204, having the power saving bit set to 0, to the WiFi network, thus, restoring the WiFi communication between the communication device 10 and the AP 12a. The WiFi driver 1020a can next conduct a subsequent WiFi transmission 106. During transmission of the sub-frame 206, the Bluetooth driver 1020b can schedule another Bluetooth transmission, invoking another interrupt event to the WiFi driver 1020a, causing the WiFi driver 1020a to complete the on-going WiFi transmission and then return to the power saving mode via the sub-frame 208 having the power saving bit set to 1. Consequently the Bluetooth driver 1020b can continue with a next Bluetooth transmission 212. The Bluetooth transmission can be a transmit slot or a receive slot, wherein each slot is 625 microseconds in length. The WiFi transmission can be an uplink sub-frame or a downlink sub-frame, wherein each sub-frame is in a millisecond range in length. When no Bluetooth and WiFi traffic is on air, the communication circuit 10 can listen for both type of traffic concurrently. In the traffic control manner set forth, the communication device 10 can employ a device driver, such as the Bluetooth driver 1020b, to manage the Bluetooth and WiFi traffic and allow two communication technologies to share the same transmission resources without signal interference and data collision.

Figure 3:
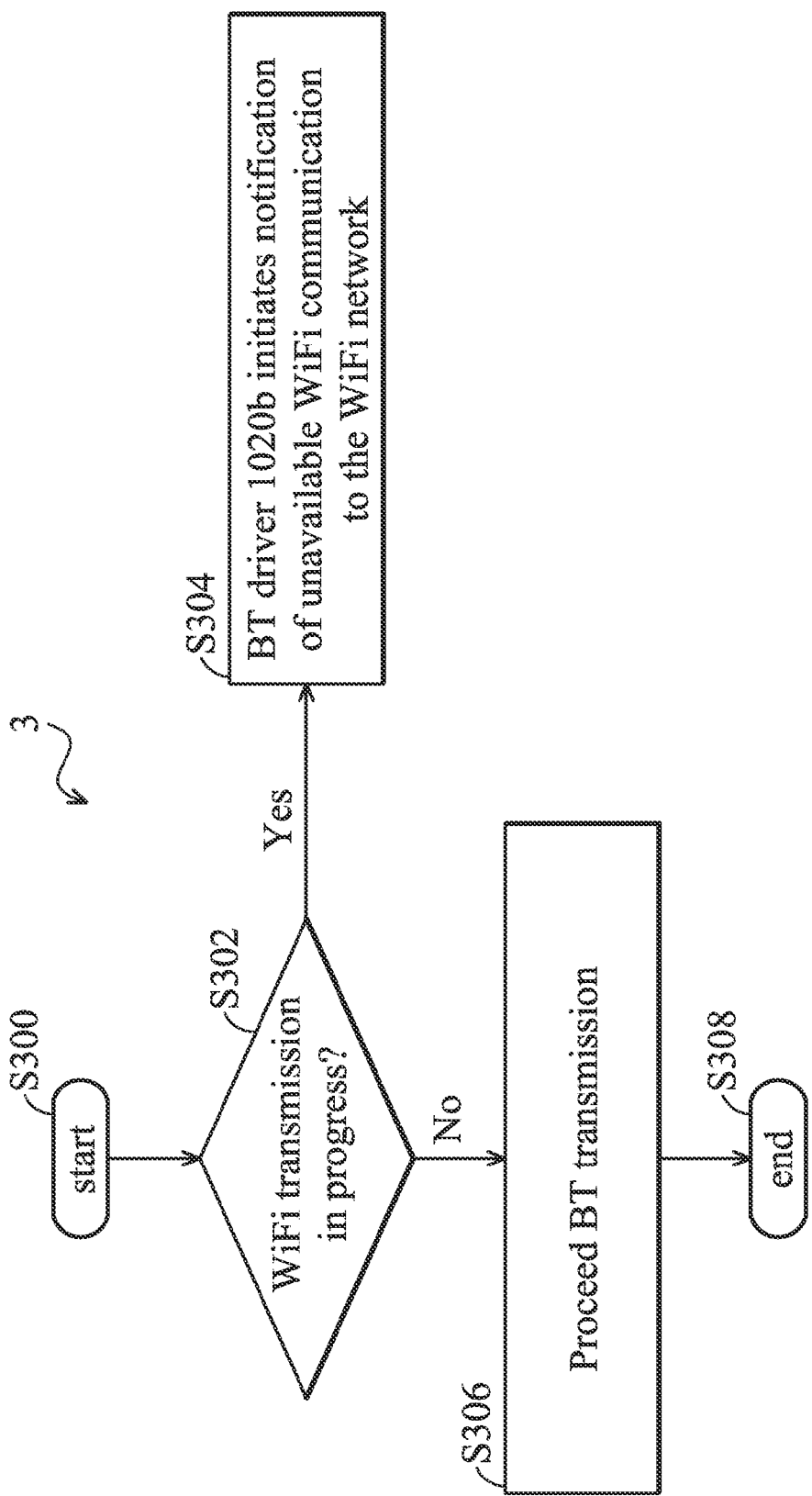
FIG. 3 is a flowchart of a time management method 3 for coordinating the WiFi and Bluetooth traffic according to an embodiment of the invention.

FIG. 3 is a flowchart of a time management method 3 for coordinating the WiFi and Bluetooth traffic according to an embodiment of the invention, incorporating the communication environment 1 in FIG. 1. The time management method 3 may be adopted by a traffic scheduler such as the Bluetooth driver 1020b.

Upon startup, the communication device 10 can set the Bluetooth driver 1020b as the traffic scheduler which can schedule an imminent Bluetooth transmission (second transmission) (S300) and determine whether the transmission resources are being used by a WiFi transmission (first transmission) before proceeding with the imminent Bluetooth transmission (S302). If the transmission resources are in use by the WiFi transmission, then the WiFi transmission is required to be suspended before the Bluetooth transmission can be transmitted via the air interface. Accordingly, the Bluetooth driver 1020b can interrupt a subsequent WiFi transmission and initiate a notification message indicating that the WiFi communication to be sent to the AP 12a by the WiFi driver 1020a is unavailable, informing the WiFi network that the communication device 10 will be entering into the power saving mode (S304). Otherwise, the Bluetooth driver 1020b can determine that the transmission resources are available and the Bluetooth driver 1020b can proceed with the Bluetooth transmission (S306). The Bluetooth driver 1020b can interrupt a subsequent WiFi transmission and initiate a notification message by generating an interrupt event invoking a WiFi callback function 10200a in the WiFi driver 1020a, thereby reducing the time for communicating between the Bluetooth driver 1020b and the WiFi driver 1020a. Details are described in the time management methods 4-13. Accordingly, the WiFi transmission can be an uplink sub-frame or a downlink sub-frame, and the Bluetooth transmission may be a transmit slot or a receive slot. The WiFi driver 1020a can make WiFi transmission requests to the Bluetooth driver 1020b. The Bluetooth driver 1020b can schedule the Bluetooth transmission and the requested WiFi transmission according to predetermined weightings and conduct the scheduled transmissions in sequence, thereby providing time division multiplexing for the Bluetooth and WiFi communication technologies without signal interference and data collision. The time management method 3 is then completed and exited (S308).

Figure 4:
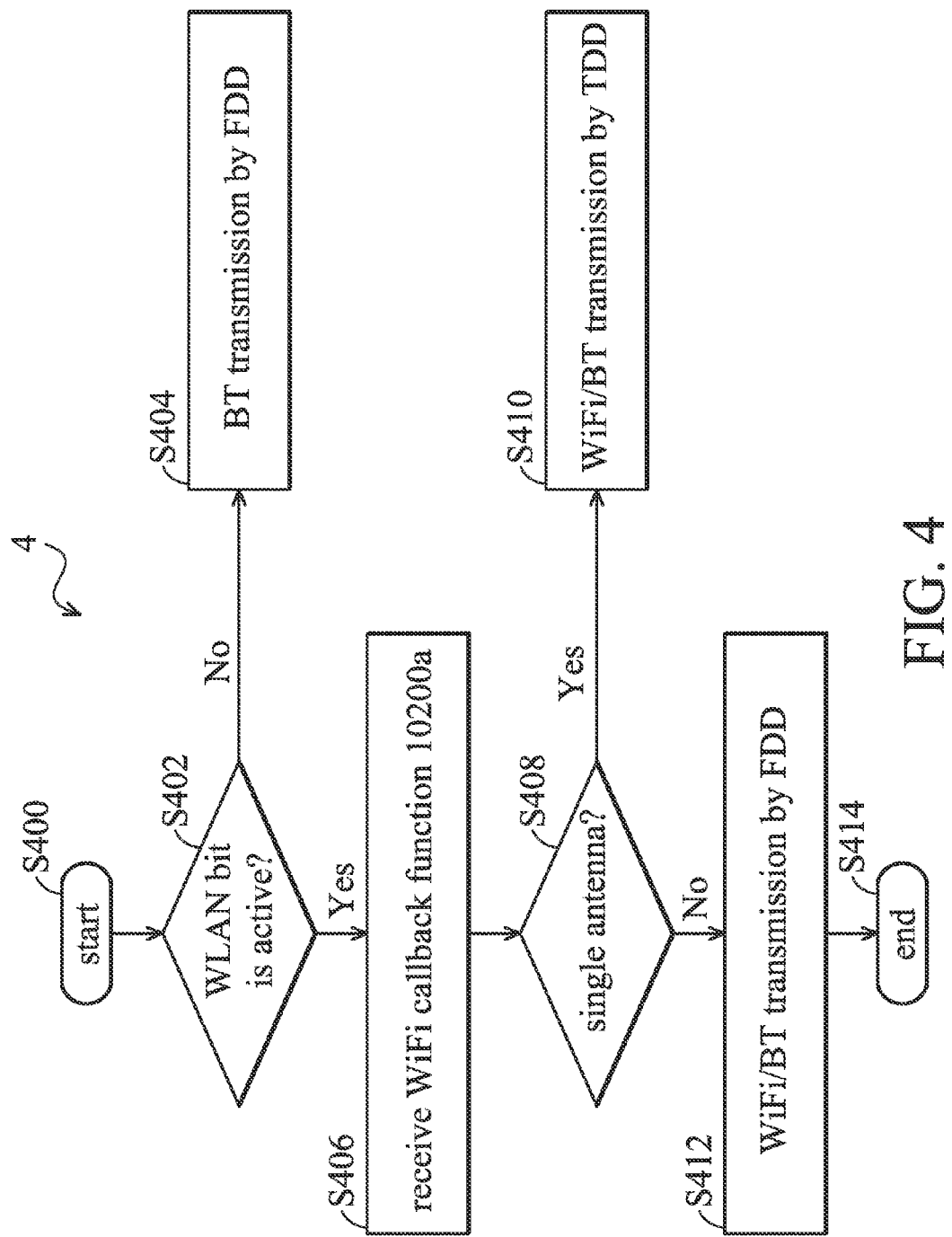
FIG. 4 is a flowchart of a time management method 4 for coordinating the WiFi and Bluetooth traffic according to another embodiment of the invention.

FIG. 4 is a flowchart of a time management method 4 for coordinating the WiFi and Bluetooth traffic according to another embodiment of the invention, incorporating the communication environment 1 in FIG. 1. The time management method 4 may be adopted by a traffic scheduler such as the Bluetooth driver 1020b.

Upon startup, the communication device 10 can set the Bluetooth driver 1020b as the traffic scheduler which can schedule an imminent Bluetooth transmission (second transmission) (S400) and determine whether a WiFi transmission (first transmission) is in progress before proceeding with the imminent Bluetooth transmission via a WLAN bit indicative of whether a WiFi transmission is ongoing or not (S402). The WLAN bit is a register value stored in common registers. If the WLAN bit is set as inactive, indicating that the transmission resources are available for the Bluetooth transmission, the Bluetooth driver 1020b can proceed with the scheduled Bluetooth transmission by Frequency Division Duplexing (FDD), multiplexing the transmit and receive slots on different frequency bands (S404). If the WLAN bit is set as active, indicating that a WiFi transmission is in progress, the Bluetooth driver 1020b can proceed the scheduled Bluetooth and WiFi transmissions by Time Division Duplexing (TDD), multiplexing the Bluetooth and WiFi transmissions in different time intervals on the same or partially the same frequency spectrum. Accordingly, in order to perform the TDD for the Bluetooth and WiFi transmissions, the Bluetooth driver 1020b has to generate an interrupt event to the WiFi driver 1020a, invoking the NULL frame with the power saving bit set as 1 to be sent to the WiFi network. Hereafter the sub-frame with the power saving bit set as 1 is referred to as a power saving frame PS1, the sub-frame with the power saving bit set as 0 is referred to as a power saving frame PS0. The Bluetooth driver 1020b can generate the interrupt event with a callback function at the WiFi driver 1020 to reduce the time for the communication between the Bluetooth driver 1020b and the WiFi driver 1020a, invoking the WiFi driver 1020a to suspend the WiFi circuit 104a and send the power saving frame PS1 to the WiFi network. Consequently, the WiFi driver 1020a can transmit a WiFi pointer (first reference) pointing to an address in the memory device 102 to the Bluetooth driver 1020b, at the address where a WiFi callback function can be retrieved back by the Bluetooth driver 1020b whenever a power saving frame PS1 is required to be sent to the WiFi network (S406). The WiFi pointer may point to the beginning of the WiFi driver 1020a, or a WiFi function in the WiFi driver 1020a for establishing a WiFi connection and generating a power saving frame PS. Details for how the Bluetooth driver 1020b can use the WiFi pointer to call the WiFi function and generate the power saving frame PS1 are provided in the FIGS. 5-7. Next, the Bluetooth driver 1020b can determine whether the communication device 10 is equipped with a single antenna or multiples antennas for the WiFi and Bluetooth communications (S408). When the WiFi and Bluetooth communications share a common antenna, the Bluetooth driver 1020b can schedule the WiFi and Bluetooth transmissions by the TDD scheme by calling the WiFi callback function 10200a (S410). When the WiFi and Bluetooth communications each have a dedicated antenna for transmissions, the Bluetooth driver 1020 can schedule the WiFi and Bluetooth transmissions by the FDD scheme, the TDD scheme, or a combination thereof by calling the WiFi callback function 10200a (S412). The time management method 4 is then completed and exited (S414).

The time management method 4 can employ the Bluetooth driver 1020b as a traffic scheduler which determines a scheduling scheme for the Bluetooth and WiFi transmissions based on the status of the WiFi communication and the number of available antennas, managing the Bluetooth and WiFi transmissions on the same spectrum without causing signal interference and data collision.

Figure 5:
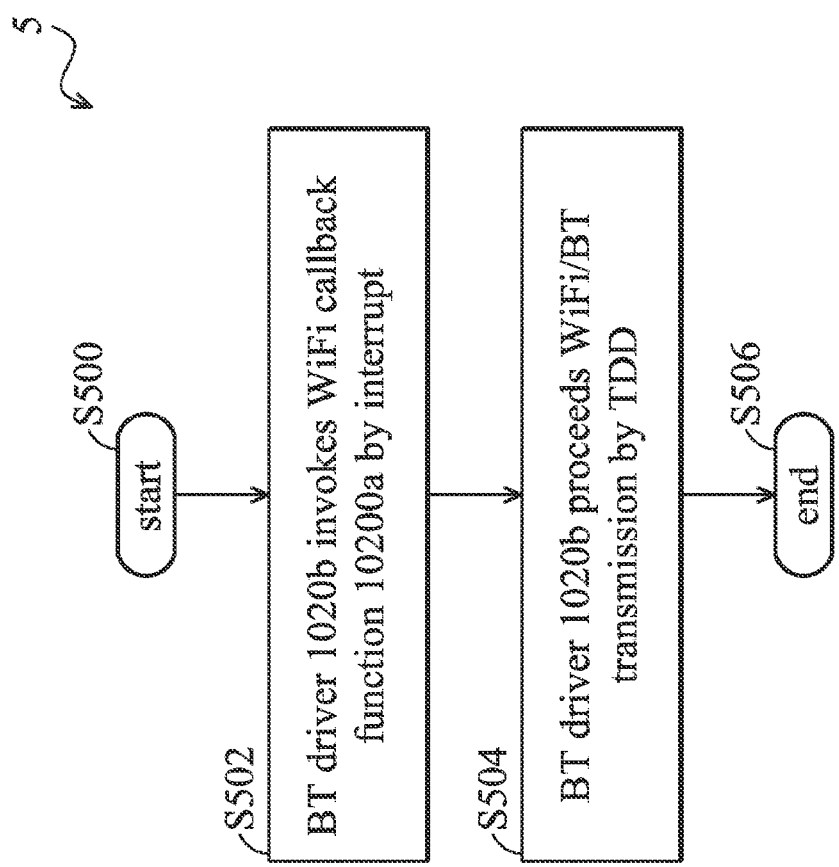
FIG. 5 is a flowchart of a TDD scheduling method 5 according to an embodiment of the invention.

FIG. 5 is a flowchart of a TDD scheduling method 5 according to an embodiment of the invention, incorporating the communication environment 1 in FIG. 1. The TDD scheduling method 5 may be used for implementing Steps S410 and S412 in FIG. 4 for managing the WiFi and Bluetooth transmissions.

Upon startup, the communication device 10 has already scheduled a Bluetooth transmission and acquired the WiFi pointer pointing to the WiFi callback function in the memory device 102, while communicating with the WiFi network through the AP 12a (S500). The Bluetooth driver 1020b can initiate an interrupt event to call back the WiFi function 10200a using the WiFi pointer when a Bluetooth transmission is scheduled, a subsequent WiFi is required to be interrupted, and a power saving frame PS1 (notification of the unavailable WiFi communication) is required to be sent to the WiFi network (S502). The Bluetooth driver 1020b can call the WiFi function 10200a to generate a power saving frame PS1 informing the WiFi network of the unavailability of the WiFi communication, in order to prevent the WiFi network from reducing the data package rate after the communication device 10 wakes up. Due to using the function callback, the communication latency for communications between the WiFi and Bluetooth drivers is reduced and controllable within a microsecond level, and the WiFi communication is suspended by the time the Bluetooth driver 1020b starts proceeds a subsequent Bluetooth transmission, as illustrated in FIG. 6.

Figure 6:
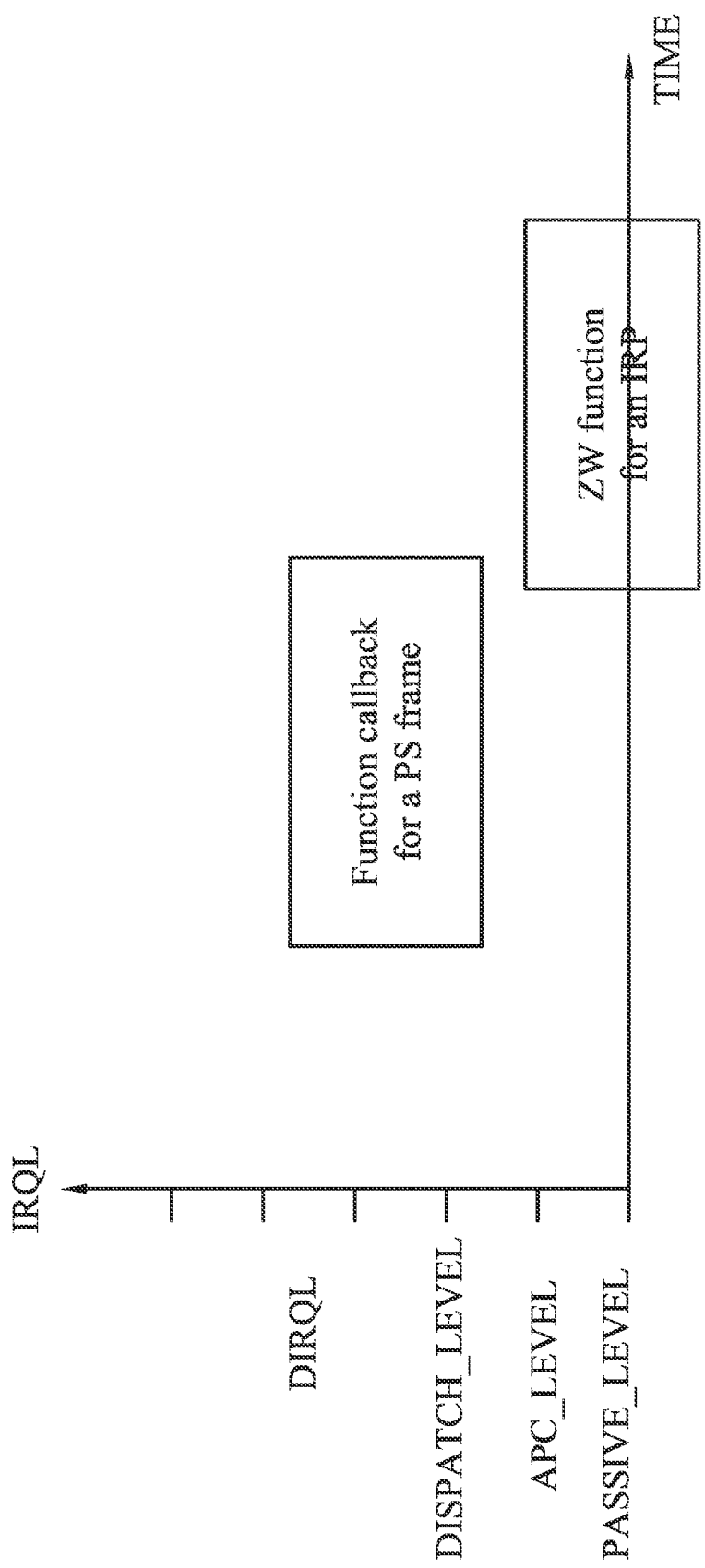
FIG. 6 shows interrupt request levels IRQL for various software function types.

FIG. 6 shows interrupt request levels IRQL for various software function types, with the vertical axis representing the IRQL and the horizontal axis showing different function types. The IRQL represents a priority ranking of an interrupt event. The processor 100 can process all interrupt events according to the IRQL thereof. All interrupt events with lower IRQLs will not interfere with a current interrupt event processed by the processor 100. The interrupt processing time of the interrupt event reduces with an increase in the IRQ level, i.e., the higher the IRQL is, the less latency the interrupt event will take. FIG. 6 lists a direct IRQL (DIRQL), a dispatch IRQL, an APC IRQL, and a passive IRQL in a decreased priority ranking. At the Direct IRQL, the interrupt event requires minimal interrupt processing time and the processor 100 can postpone all other operations and execute the DIRQL interrupt event within a microsecond range. At the passive IRQL, the processor 100 can only execute the interrupt event with the passive IRQL event when higher IRQL interrupts are completed, resulting in long and uncontrollable interrupt processing time, for example, 100 microseconds to 10 milliseconds. The Bluetooth driver 1020b can instruct the WiFi driver 1020a to interrupt a subsequent WiFi transmission and issue the power saving frame PS1 to the WiFi network by the function callback or an input output request packet (IRP). FIG. 6 shows an interrupt event for a function callback calling for a power saving flame PS may be at a DIRQL or a dispatch IRQL, and an interrupt event for a ZW function requesting an IRP is at the passive level. Therefore, when the Bluetooth driver 1020b generates the interrupt event for transmitting the IRP, the time from initiating the interrupt event to actual delivery of the power saving frame PS can be long and uncontrollable. Further, the WiFi driver 1020a can use up to 100 microseconds to process the requests sent by the IRP, causing further data processing delay before sending the power saving frames PS. When the Bluetooth driver 1020b generates the interrupt event for a function callback, the time from initiating the interrupt event to actual delivery of the power saving frame PS can be kept within 50 milliseconds (the time is variable and not controlled), rendering reduced and manageable data processing latency for generating and sending the power saving frames PS.

Referring now to FIG. 5, after the WiFi communication is suspended, the Bluetooth driver 1020b can proceed with the scheduled Bluetooth transmission, which includes receiving a receive slot or transmitting a transmit slot on the Bluetooth radio link (S504). The TDD scheduling method 5 is then completed and exited (S506).

The TDD scheduling method 5 can be employed by a traffic scheduler, using an interrupt event in conjunction with a function callback to reduce data processing latency for generating and sending the power saving frames PS, so that when the Bluetooth driver 1020b starts to proceed with a subsequent Bluetooth transmission, the WiFi transmission is no longer present on the communication channel, reducing signal interference and data collision for the WiFi and Bluetooth data transmissions.

Figure 7:
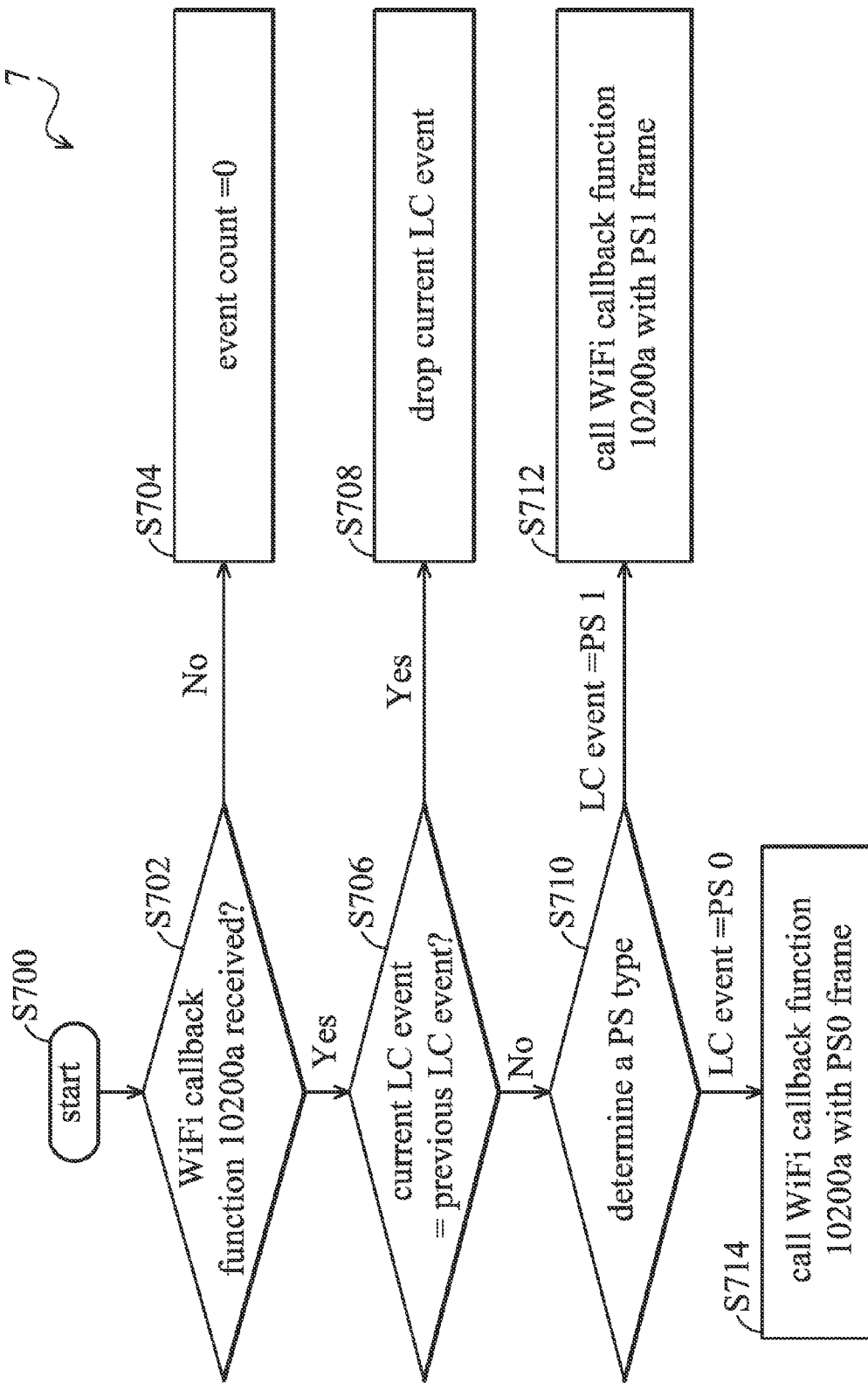
FIG. 7 is a flowchart of a WiFi and Bluetooth traffic TDD scheduling method 7 according to another embodiment of the invention.

FIG. 7 is a flowchart of a WiFi and Bluetooth traffic TDD scheduling method 7 according to another embodiment of the invention, incorporating the communication environment 1 in FIG. 1. The TDD scheduling method 7 may be used for implementing Steps S410 and S412 in FIG. 4 for managing the WiFi and Bluetooth transmissions.

Upon startup, the communication device 10 has already scheduled a Bluetooth transmission and acquired the WiFi pointer pointing to the WiFi callback function, while communicating with the WiFi network through the AP 12a (S700). The Bluetooth driver 1020b can determine whether the WiFi pointer is received before initiation of an interrupt event (S702). When the Bluetooth driver 1020b has not yet received the WiFi pointer, it cannot perform the function callback operation, therefore, the Bluetooth driver 1020b can set an event count to be 0 (S704). In some implementations, the Bluetooth driver 1020b can request for the WiFi callback function 10200a from the WiFi driver 1020a after determining the absence of the WiFi pointer. When the WiFi pointer is received, the Bluetooth driver 1020b can determine whether an on-going interrupt event is identical to a previous interrupt event, i.e., the Bluetooth driver 1020b determines whether the same interrupt event has been requested repeatedly (S706). When the same interrupt event has been requested twice, the Bluetooth driver 1020b can discard the on-going interrupt event, since it has been executed in a previous interrupt event (S708). When the on-going interrupt event is different from a previous interrupt event, the Bluetooth driver 1020b can determine a type of the power saving frame to be sent (S710). When the Bluetooth driver 1020b requests to interrupt the current WiFi communication and informs the WiFi network of the unavailability of the WiFi communication, the interrupt event can call the WiFi callback function 10200a with the power saving frame PS1 (S712). Otherwise, when the Bluetooth driver 1020b has completed the scheduled Bluetooth transmission and wishes to resume the WiFi communication, the interrupt event can call the WiFi callback function 10200a with the power saving frame PS0 (S714). The WiFi driver 1020a can receive the interrupt event and execute the callback function 10200a upon completion of the WiFi transmission in progress. Thus the TDD scheduling method 7 is completed and exited.

The TDD scheduling method 7 can be employed by a traffic scheduler, using an interrupt event in conjunction with a function callback to reduce data processing latency for generating and sending the power saving frames PS, reducing signal interference and data collision for the WiFi and Bluetooth data transmissions.

Figure 8:
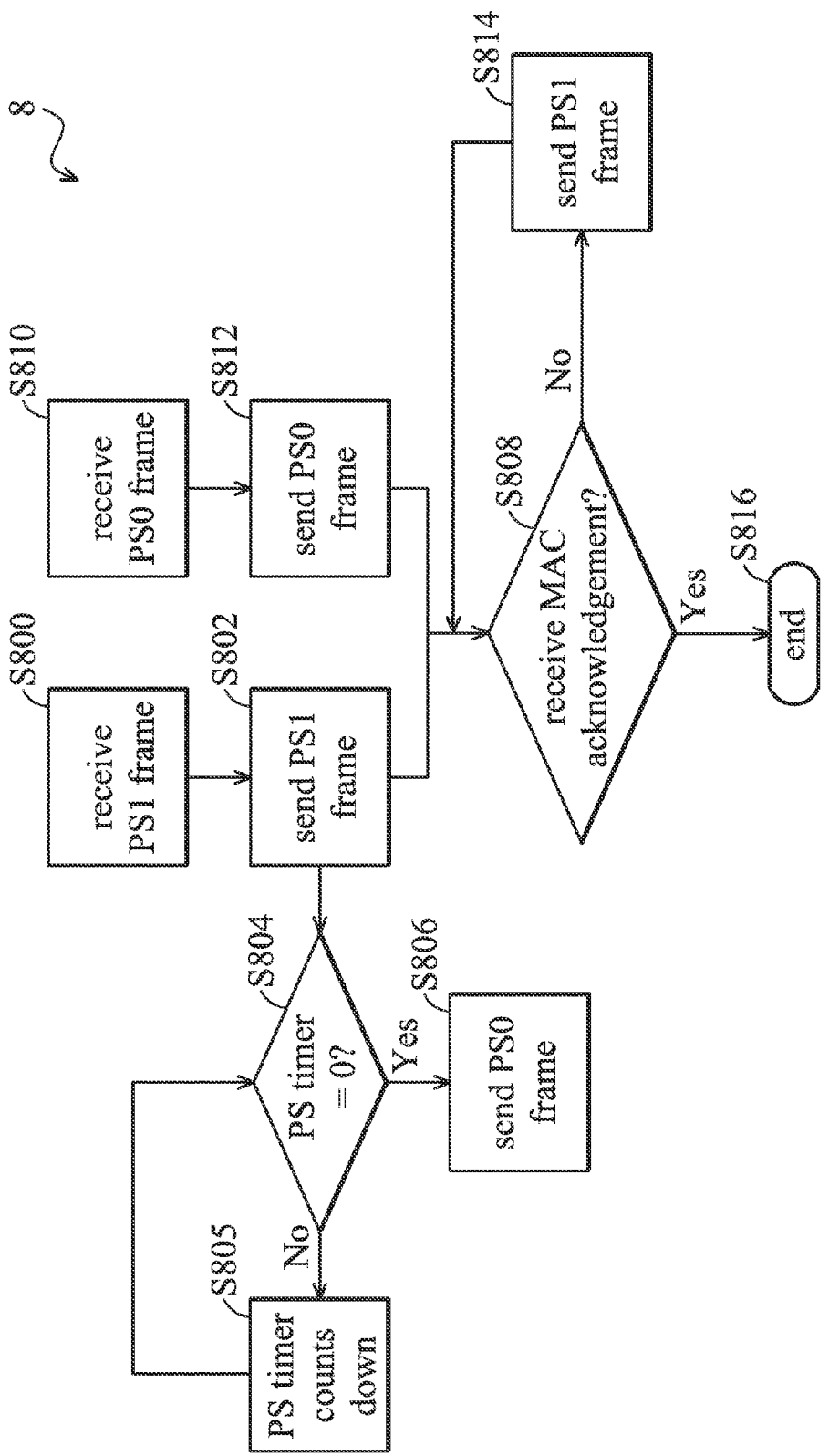
FIG. 8 is a flowchart of a communication control method 8 for a subordinate communication circuit according to an embodiment of the invention.

FIG. 8 is a flowchart of a communication control method 8 for a subordinate communication circuit according to an embodiment of the invention, incorporating the communication environment 1 in FIG. 1. The communication control method 8 may be adopted by the WiFi driver 1020a.

Figure 11:
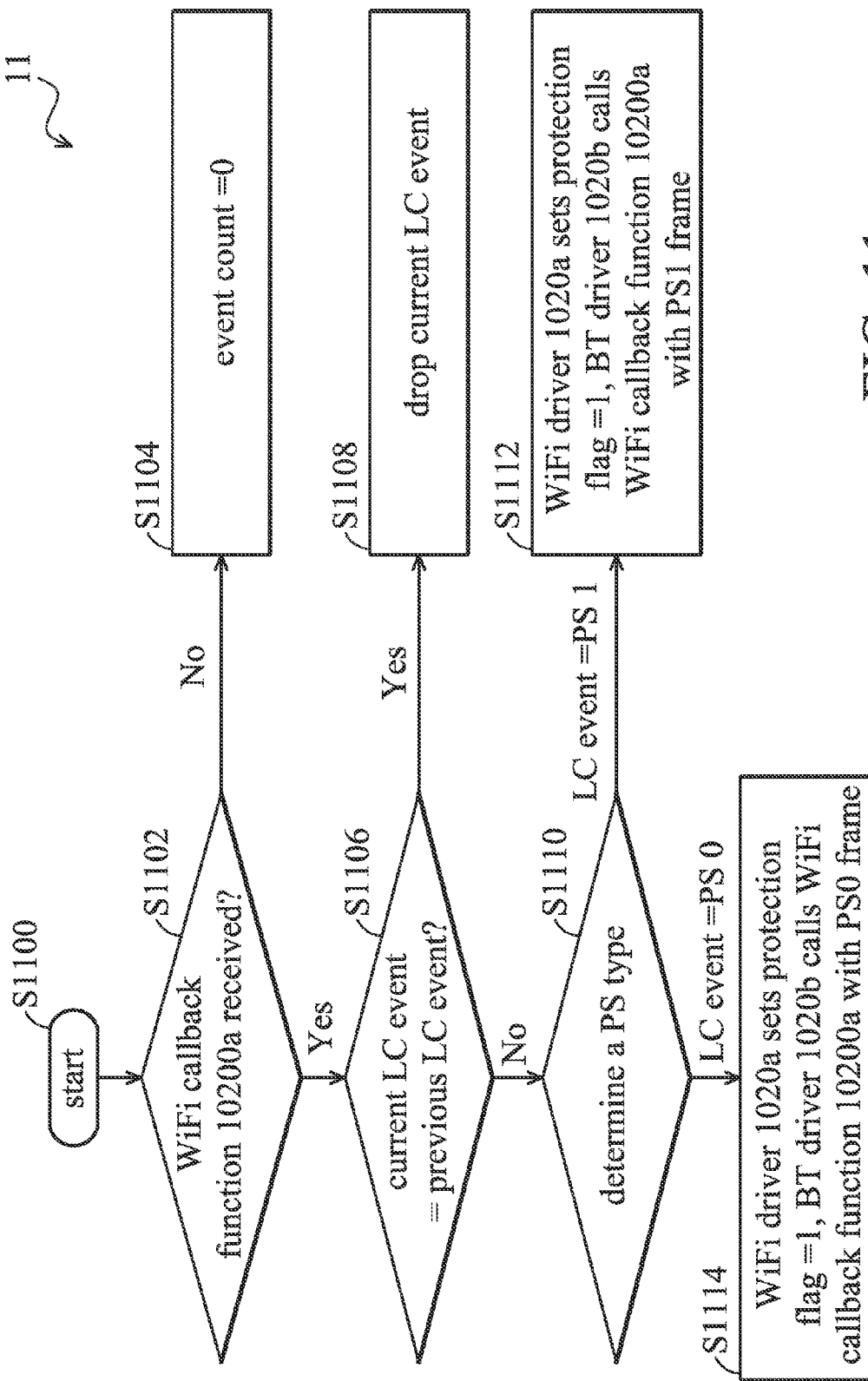
FIG. 11 is a flowchart of a WiFi and Bluetooth traffic TDD scheduling method 11 according to another embodiment of the invention.

Upon startup, the communication device 10 has already scheduled a Bluetooth transmission and the WiFi driver 1020a has received the interrupt event for the function callback with the power saving frame PS. When the WiFi driver 1020a receives the function callback with the power saving frame PS1 (S800), it can send a NULL uplink sub-frame having the power saving bit set to 1 to the WiFi network through the AP 12a, informing of the communication device 10, entering into a sleep mode and the WiFi communication, not being available, while setting a power saving timer to a predetermined countdown time interval $T_{PS}$ (S802). When the WiFi driver 1020a receives the function callback with the power saving frame PS0 (S810), it can send a NULL uplink sub-frame having the power saving bit set to 0 to the WiFi network through the AP 12a, informing of the communication device 10 being awakened, and available for WiFi communication again (S812). After delivery of the power saving frame PS to the WiFi network, the WiFi driver 1020a can wait for receiving a MAC acknowledgement message from the WiFi network, which indicates that the WiFi network has received the power saving frame PS1 (S808). When the communication device 10 fails to receive the acknowledge message within a predetermined time interval, it may be determined that the power saving frame PS1 has failed to be delivered to the WiFi network and thus, the frame PS1 is resent again (S814), and the waiting for the MAC acknowledgement message is conducted (S808). In certain embodiments, Steps S808 and S814 may be omitted from the communication control method 8, the communication device 10 may exit to Step S816 after Step S812. When the communication device 10 receives the acknowledge message, the communication control method is completed and exited (S816). Further, in a case where the WiFi driver 1020a receives no requests from the Bluetooth driver 1020b for restoring the WiFi communication long after the suspension, the WiFi driver 1020a can adopt a mechanism to restore the WiFi communication after a certain real-time interval by setting the power saving timer to the predetermined countdown time interval $T_{PS}$ for counting the suspension time. The WiFi driver 1020a can determine whether the power saving timer has expired (S804), and if so, the WiFi driver 1020a can generate and send a power saving frame PS0 to inform the WiFi network of it being woken up from the sleep mode and ready for a WiFi communication (S806). Otherwise, the power saving timer can continue to count down (S805) and check for the expiry of the countdown (S804). FIG. 11 is a flowchart of a WiFi and Bluetooth traffic TDD scheduling method 11 according to another embodiment of the invention, incorporating the communication environment 1 in FIG. 1.

The communication control method 8 can sent the power saving frame PS to the WiFi network, informing of the WiFi communication status of the communication device 10 being in the sleep mode or wakeup mode.

Figure 9:
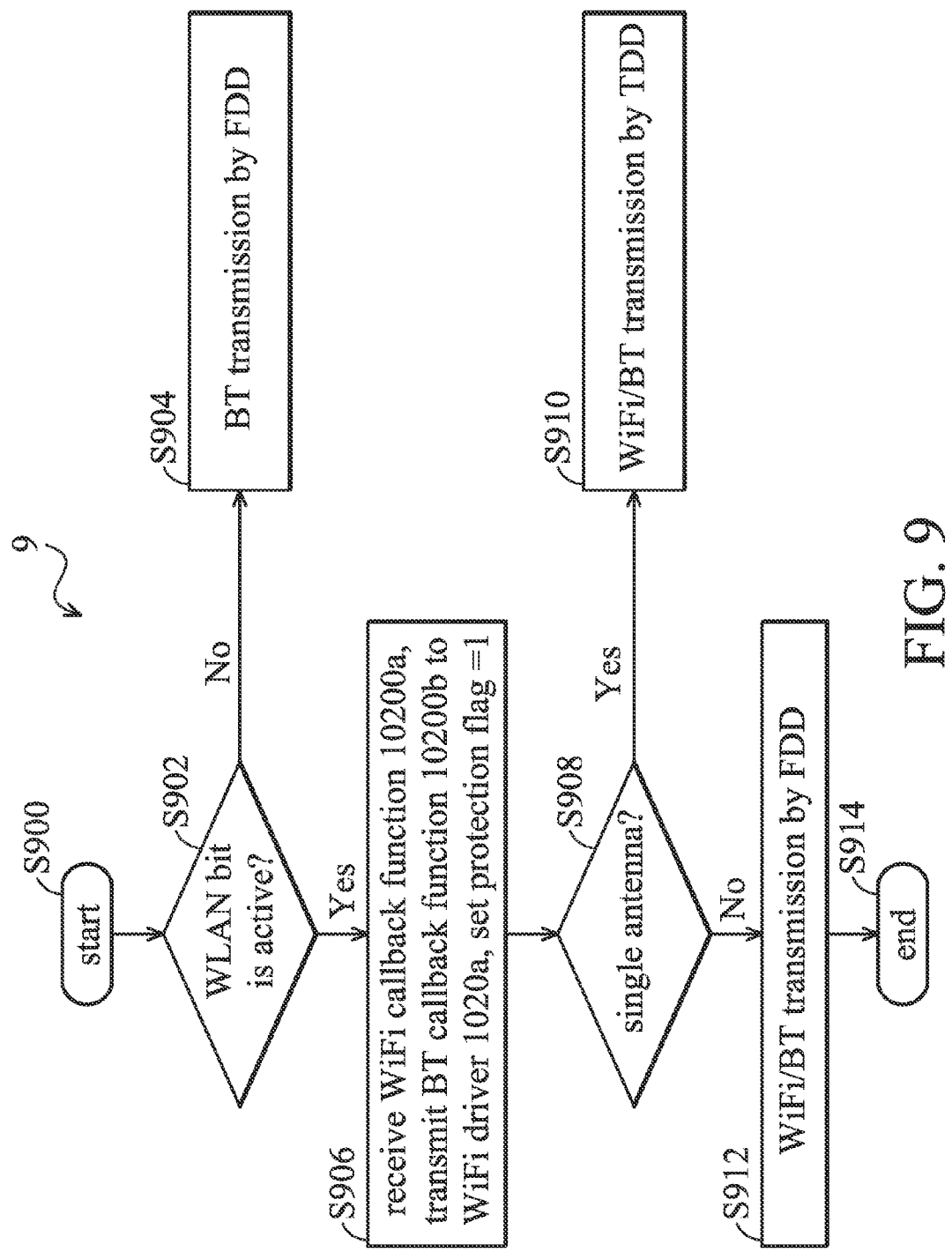
FIG. 9 is a flowchart of a time management method 9 for coordinating the WiFi and Bluetooth traffic according to another embodiment of the invention.

FIG. 9 is a flowchart of a time management method 9 for coordinating the WiFi and Bluetooth traffic according to another embodiment of the invention, incorporating the communication environment 1 in FIG. 1, adopted by a traffic scheduler such as the Bluetooth driver 1020b.

The time management method 9 is similar to the time management method 4, except that an additional protection mechanism is implemented in Step S906 to prevent the communication device 10 from concurrently communicating with two or more communication technologies on the same spectrum. Steps S900, S904-S914 are identical to Steps S400, S404-S414, thus, reference may be made to the preceding sections and will not be repeated here.

As in the time management method 4, the Bluetooth driver 1020b is set as the traffic scheduler. However, the Bluetooth driver 1020b can only determine whether the WiFi transmission has ended and proceed with the scheduled Bluetooth transmission upon receiving a notification from the WiFi driver 1020a. Specifically, in Step S906, the Bluetooth driver 1020b can further set up a protection flag indicating the WiFi communication status and deliver a Bluetooth pointer pointing to a Bluetooth callback function 10200b, which is to be called back from the WiFi driver 1020a, for clearing the protection flag to 0. The protection flag is set to 1 in Step S906, indicating that the WiFi communication has not yet been suspended. When the WiFi communication is completely suspended and the WiFi network has acknowledged the suspension, the protection flag will again be set to 0 by the Bluetooth callback function 10200b, indicating that the WiFi communication is no longer present on the shared spectrum. The Bluetooth callback function 10200b may be a program function in the Bluetooth driver 1020b for processing all of the BT transmissions, including the transmit and receive slots.

The time management method 9 can employ the Bluetooth driver 1020b as a traffic scheduler which determines a scheduling scheme for the Bluetooth and WiFi transmissions, while providing a protection mechanism which prevents the shared spectrum from being used by the Bluetooth and WiFi transmission concurrently, reducing signal interference and data collision.

Figure 10:
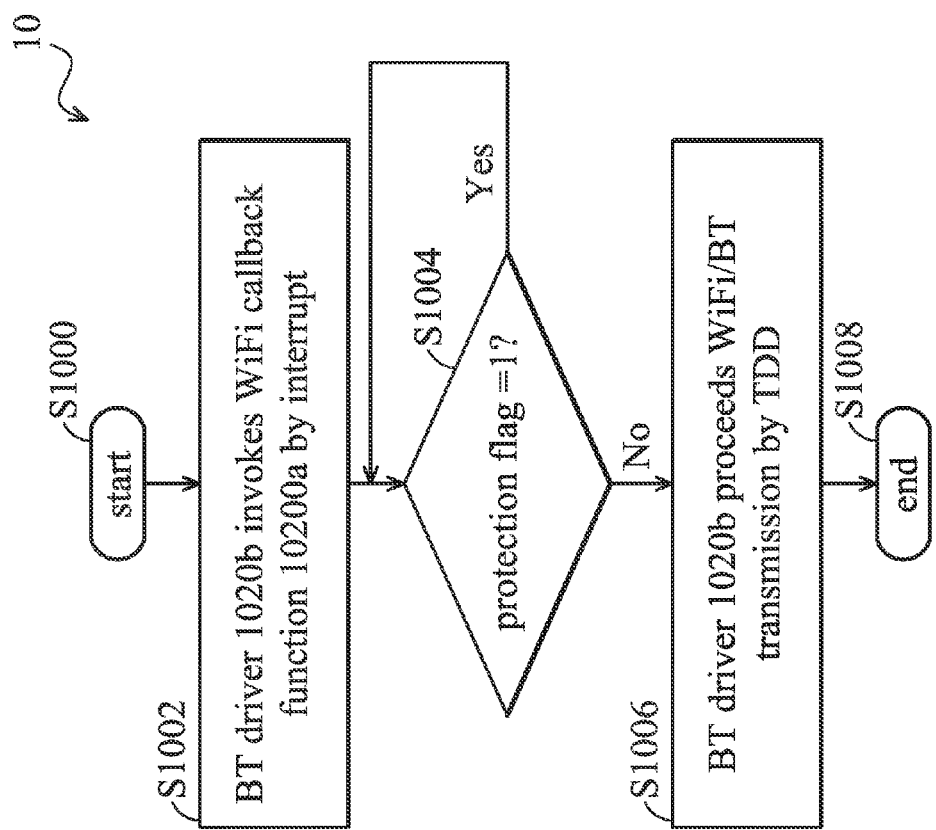
FIG. 10 is a flowchart of a WiFi and Bluetooth traffic TDD scheduling method 10 according to another embodiment of the invention.

FIG. 10 is a flowchart of a TDD scheduling method 10 according to another embodiment of the invention, incorporating the communication environment 1 in FIG. 1. The TDD scheduling method 10 may be used in Steps S910 and S912 in FIG. 9 for the Bluetooth driver 1020b to manage the WiFi and Bluetooth transmissions by TDD.

The time management method 10 is similar to the time management method 5, except that an additional Step S1004 is inserted to prevent the communication device 10 from concurrently communicating with two or more communication technologies on the same spectrum. Steps S1000, S1006-S1008 are identical to Steps S400-S404, thus, reference may be made to the preceding sections and will not be repeated here. In Step S1004, the Bluetooth driver 1020b can check the protection flag continuously or regularly when the protection flag remains as 1, and only schedule and proceed with the WiFi and Bluetooth transmissions when the protection flag has been cleared by the WiFi driver 1020a, when the WiFi driver 1020a is 0.

The TDD scheduling method 10 can employ the Bluetooth driver 1020b as a traffic scheduler which determines a scheduling scheme for the Bluetooth and WiFi transmissions, while providing a protection mechanism which prevents the shared spectrum from being used by the Bluetooth and WiFi transmission concurrently, reducing signal interference and data collision.

FIG. 11 is a flowchart of a TDD scheduling method 11 according to another embodiment of the invention, incorporating the communication environment 1 in FIG. 1. The TDD scheduling method 11 may be used in Steps S910 and S912 in FIG. 9 for the Bluetooth driver 1020b to manage the WiFi and Bluetooth transmissions by TDD.

The time management method 11 is similar to the time management method 7, except that Step S1012 and 1114 are different from Step S712 and S714, preventing the communication device 10 from concurrently communicating with two or more communication technologies on the same spectrum. Steps S1100-S1110 are identical to Steps S400-S410, thus, reference may be made to the preceding sections and will not be repeated here. In Step S1112 and S1114, the Bluetooth driver 1020b can set the protection flag as 1, call the WiFi callback function for transmission suspension, and only schedule and proceed with the WiFi and Bluetooth transmissions when the protection flag has been cleared by the WiFi driver 1020a, when the WiFi driver 1020a is 0.

The TDD scheduling method 11 can employ the Bluetooth driver 1020b as a traffic scheduler which determines a scheduling scheme for the Bluetooth and WiFi transmissions, while providing a protection mechanism which prevents the shared spectrum from being used by the Bluetooth and WiFi transmission concurrently, reducing signal interference and data collision.

Figure 12:
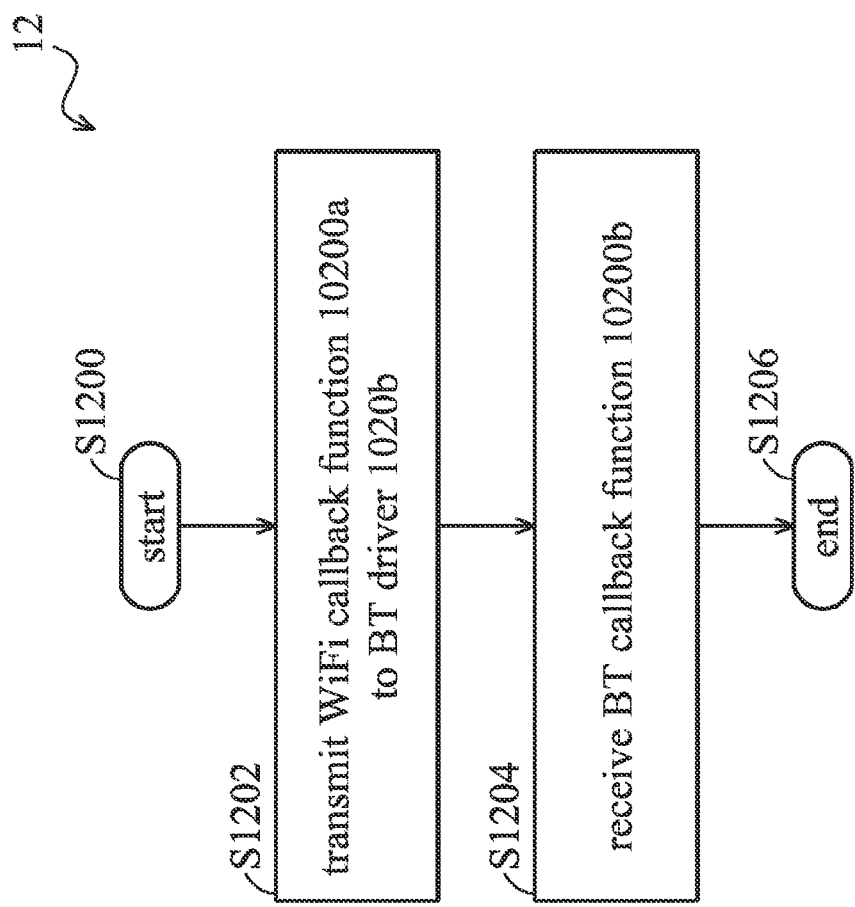
FIG. 12 is a flowchart of a callback function setup method 12 for a subordinate communication circuit according to an embodiment of the invention.

FIG. 12 is a flowchart of a callback function setup method 12 for a subordinate communication circuit according to an embodiment of the invention, incorporating the communication environment 1 in FIG. 1. The TDD scheduling method 11 may be adopted by the WiFi driver 1020a.

Upon startup, the WiFi driver 1020a and the Bluetooth driver 1020b are registered and installed into the memory device 102 by the processor 100 (S1200). The WiFi driver 1020a and the Bluetooth driver 1020b can then exchange the WiFi pointer pointing to the WiFi callback function 10200a and the Bluetooth point pointing to the Bluetooth callback function 10200b. Thus the WiFi driver 1020a can transmit the WiFi pointer to the Bluetooth driver 1020b (S1202) and receive the Bluetooth pointer from the Bluetooth driver 1020b (S1204). The pointer exchanges may occur upon completion of the device driver registration, and may occur immediately before the Bluetooth driver 1020b is going to proceed with the scheduled Bluetooth transmission. The WiFi pointer may point to the beginning of the WiFi driver 1020a, or a WiFi function in the WiFi driver 1020a for establishing a WiFi connection and generating a power saving frame PS. The Bluetooth pointer may point to the beginning of the Bluetooth driver 1020b, or a Bluetooth function 10200b in the Bluetooth driver 1020b for clearing the protection flag. After the pointer exchange, the callback function setup method 12 is completed and exited The callback function setup method 12 can exchange pointers between the WiFi driver 1020a and the Bluetooth driver 1020b for suspending the WiFi communication and setting up a protection mode, preventing the shared spectrum from being used by the Bluetooth and WiFi transmission concurrently, reducing signal interference and data collision.

Figure 13:
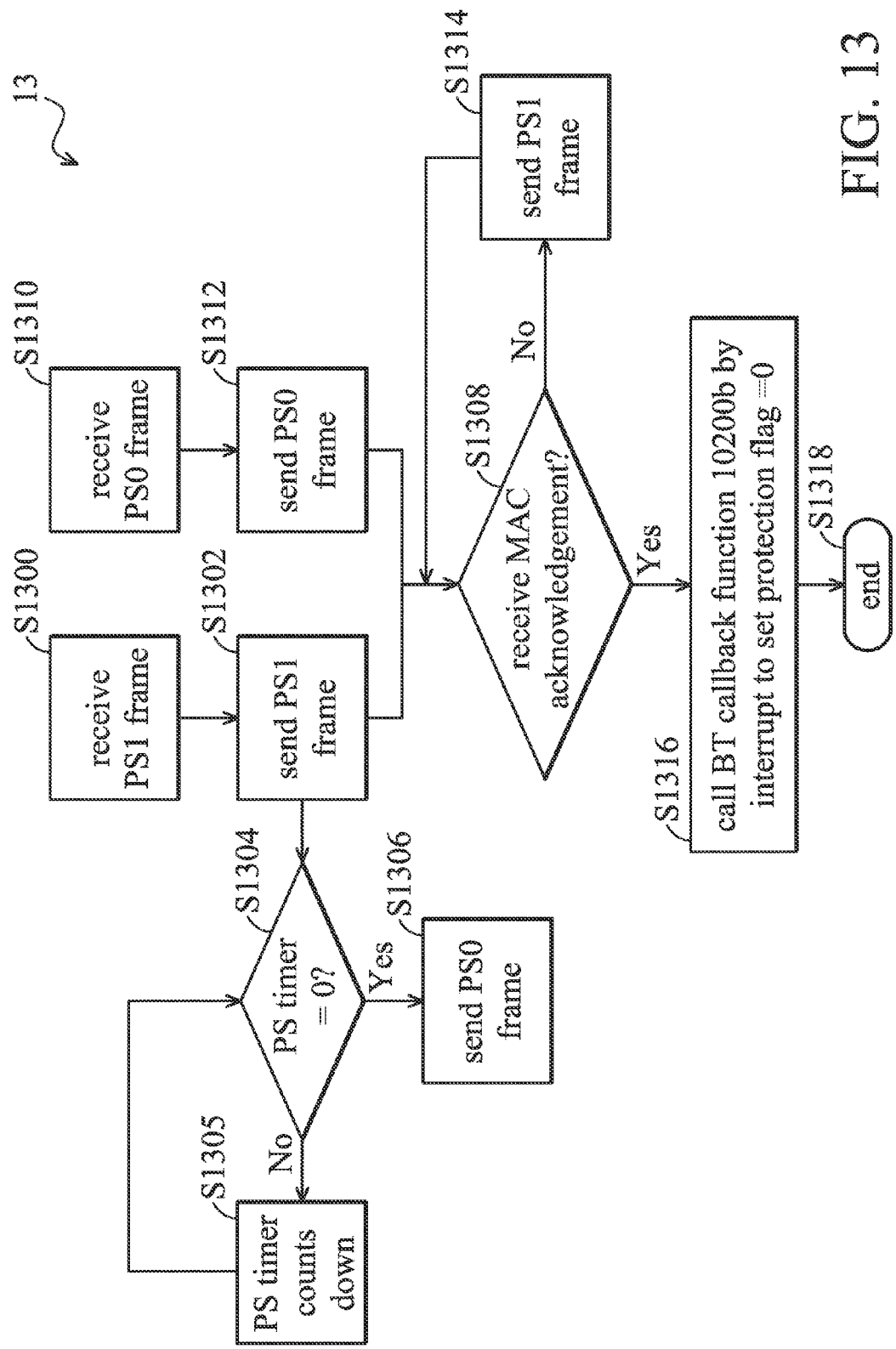
FIG. 13 is a flowchart of a communication control method 13 for a subordinate communication circuit according to an embodiment of the invention.

FIG. 13 is a flowchart of a communication control method 13 for a subordinate communication circuit according to an embodiment of the invention, incorporating the communication environment 1 in FIG. 1. The communication control method 13 may be adopted by the WiFi driver 1020a.

The time management method 13 is similar to the time management method 8, except that Step S1316 is added to call back the Bluetooth callback function 10200b, clearing the protection flag and proceeding with the scheduled Bluetooth transmission. In particularly, in Step S1316, after receiving the MAC acknowledgement message for the power saving frame PS1 from the WiFi network, the WiFi driver 1020a can be certain that no WiFi traffic is proceeding on the shared spectrum. Thus, the WiFi driver 1020a can call the Bluetooth callback function 10200b via the Bluetooth pointer for clearing the protection flag, allowing the Bluetooth driver 1020b to proceed with the scheduled transmission.

The time management method 13 can be adopted by the WiFi driver 1020a to implement traffic protection, preventing the shared spectrum from being used by the Bluetooth and WiFi transmission concurrently, reducing signal interference and data collision.

Various embodiments of the invention provide system and method for enabling coexistence between a plurality of communication technologies on a communication device. The method minimizes interference between the plurality of communication technologies. Moreover, in one of the embodiments the method may be implemented without the need to change the actual architecture of the plurality of communication technologies. Further, in one of the embodiments the method and system reduces the implementation cost as the plurality of communication technologies share various components of the communication device.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, processor, microprocessor or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, performed by a communication device to manage communications with a first and a second network having a first and a second communication technology, respectively, comprising:
    appointing a second communication module of the second communication technology as a traffic scheduler for scheduling a first transmission of the first communication technology and a second transmission of the second communication technology;
    determining, by the second communication module, whether the first transmission of the first communication technology is in progress before proceeding with the second transmission having the second communication technology;
    when the first transmission is in progress, initiating, by the second communication module, notification of the unavailability of the first communication technology to the first network; and
    proceeding, by the second communication module, with the second transmission.

2. The method of claim 1, wherein the first and second communication modules are device drivers, and the method further comprises:
    installing the first and second communication modules associated with a first and a second communication circuit to a memory device; and
    receiving, by the second communication module, a first reference of a first callback function of the first communication module in the memory device.

3. The method of claim 2, wherein the initiating the notification of the unavailability of the first communication technology step comprises, when the first transmission is in progress, generating a first interrupt, by the second communication module, to invoke the first callback function according to the first reference.

4. The method of claim 1, wherein the second communication technology is operative with a fixed time slot and the first communication technology is operative with a variable time interval.

5. The method of claim 1, wherein a minimal time unit of a data transmission operative by the second communication technology is less than that of the first communication technology.

6. The method of claim 2, wherein the initiating the notification of the unavailability of the first communication technology step comprises controlling, by the first callback function, the first communication circuit to inform the first network that the first communication technology is in a power saving state, wherein all communication activities are suspended.

7. The method of claim 2, further comprising:
    when the second transmission is completed, invoking, by the second communication module, the first callback function, to inform the first network that the first communication technology is available for communication.

8. The method of claim 2, further comprising:
    delivering, by the second communication module, a second reference of a second callback function of the second communication module in the memory device to the first communication module; and
    generating a second interrupt, by the first communication module, to invoke the second callback function when the first communication module has received an acknowledgement for the notification of the unavailability of the first communication technology from the first network, wherein the proceeding with second transmission comprises proceeding, by the second callback function, with the second transmission.

9. The method of claim 1, wherein the first and second communication technologies may be a Bluetooth, a Wireless Local Area Network (WLAN), a Worldwide Interoperability Microwave Access (WiMAX), a Wireless Metropolitan (WMAN), and a Long Term Evolution (LTE) technology.

10. The method of claim 1, further comprising: determining, by the second communication module, communication traffic of the first and second communication technologies according to first and second weightings.

11. The method of claim 1, further comprising, suspending the first communication technology after the first transmission is completed.

12. A communication device, managing communications with a first and a second network, comprising a processor and a memory device,
    wherein the processor is configured to install first and second device drivers to the memory device and execute the first device driver to perform communication with the first network having a first communication technology, and execute the second device driver to perform communication with the second network having a second communication technology, and appoint the second device driver as a traffic scheduler for scheduling a first transmission of the first communication technology and a second transmission of the second communication technology, and the second driver is configured to determine whether the first transmission of the first communication technology is in progress before proceeding with the second transmission having the second communication technology, and when the first transmission is in progress, initiate an unavailable period of the first communication technology, and initiate notification of the unavailability of the first communication technology to the first network, and proceed with the second transmission.

13. The communication device of claim 12, wherein the processor is configured to execute the second device driver to perform receiving of a first reference of a first callback function of the first device driver in the memory device.

14. The communication device of claim 13, wherein the processor is configured to execute the second device driver to perform generating a first interrupt to invoke the first callback function according to the first reference when the first transmission is in progress.

15. The communication device of claim 12, wherein the second communication technology is operative with a fixed time slot and the first communication technology is operative with a variable time interval.

16. The communication device of claim 12, wherein a minimal time unit of a data transmission operative by the second communication technology is less than that of the first communication technology.

17. The communication device of claim 13, wherein the processor is configured to execute the first callback function, to perform informing to the first network that the first communication technology is in a power saving state, wherein all communication activities are suspended.

18. The communication device of claim 13, wherein the processor is configured to execute the second device driver to perform invoking the first callback function, to inform the first network that the first communication technology is available for communication when the second transmission is completed.

19. The communication device of claim 13, wherein the processor is configured to execute the second device driver to perform delivery of a second reference of a second callback function of the second device driver in the memory device to the first device driver, and execute the first device driver to perform generation of a second interrupt to invoke the second callback function when the first device driver has received an acknowledgement for the notification of the unavailability of the first communication technology from the first network, and execute the second callback function to perform proceeding with the second transmission.

20. The communication device of claim 12, wherein the first and second communication technologies may be a Bluetooth, a Wireless Local Area Network (WLAN), a Worldwide Interoperability Microwave Access (WiMAX), a Wireless Metropolitan Area Network (WMAN), and a Long Term Evolution (LTE) technology.

21. The communication device of claim 12, wherein the processor is configured to execute the second device driver to perform determination of the communication traffic of the first and second communication technologies according to first and second weightings.

22. The communication device of claim 12, wherein the processor is configured to execute the second device driver to perform suspension of the first communication technology after the first transmission is completed.

* * * * *